United States Patent [19]

Muench

[11] 4,266,511
[45] May 12, 1981

[54] ORNAMENTAL AND PROTECTIVE COLLAR FOR AN ANIMAL COLLAR

[76] Inventor: Helen S. Muench, 130 Windsor Ave., Westmont, N.J. 08108

[21] Appl. No.: 90,337

[22] Filed: Nov. 1, 1979

[51] Int. Cl.³ ............................................. A01K 27/00
[52] U.S. Cl. ..................................... 119/106; 119/156
[58] Field of Search ................................ 119/106, 156

[56] References Cited

U.S. PATENT DOCUMENTS

| 2,721,257 | 10/1955 | Knox | 119/106 X |
| 3,765,376 | 10/1973 | Higgins | 119/106 |
| 3,814,061 | 6/1974 | Aries et al. | 119/106 |
| 3,978,820 | 9/1976 | Drehman | 119/106 |
| 4,141,322 | 2/1979 | Evans et al. | 119/106 |

Primary Examiner—Hugh R. Chamblee
Attorney, Agent, or Firm—Robert K. Youtie

[57] ABSTRACT

A strip of protective and decorative fabric for extension along the exterior of an animal collar, the fabric being provided on its inner side with collar receiving loops and on its ends with buckle engaging ties.

5 Claims, 3 Drawing Figures

ORNAMENTAL AND PROTECTIVE COLLAR FOR AN ANIMAL COLLAR

BACKGROUND OF THE INVENTION

As is well known in the field of pet care, animal collars chosen for attractiveness and ornamentation rapidly soil and deteriorate to lose their attractiveness while remaining functionally satisfactory; and those chosen for functional attributes are often lacking in aesthetic qualities.

In addition, the common use today of flea and tick repelling collars, generally called flea collars, poses problems both of aesthetic appearance, as well as the desirability that human skin be protected from the contact with the flea collars, as in the handling of animals.

There have, in the prior art, been proposed a number of animal collar covers. However, such prior art covering device have not satisfactorily overcome the above mentioned problems. The prior art of which applicant is aware is listed below: U.S. Pat. Nos. 649,026, 3,814,061, 2,734,483, 3,817,218, 2,798,458, Des. 130,001, 3,765,376, Des. 131,052, Des. 206,526, Des. 206,749.

While the collar cover of the present invention has been primarily developed and employed for use in connection with dogs, and particularly for the more attractive breeds of dogs, the use of the terminology "dog collar" and "dog collar cover" is employed herein as illustrative, and is intended to comprehend collars and collar covers for a wide variety of pets and animals.

As will appear from the prior art, the devices thereof were subject to various difficulties, some prior art devices failing to provide openings for escape of flea collar medicament to the animal; other of the prior art devices requiring the use of beads, buttons, and the like, which are dangerous to animals by ingestation and otherwise lacking in durability and safety.

SUMMARY OF THE INVENTION

It is, therefore, an important object of the present invention to provide a cover for animal collars which is adapted for highly attractive and aesthetically appealing designs, entirely safe in use both to animals and persons, can be quickly and easily applied to and removed from an animal collar, is highly effective to protect persons handling animals from excessive exposure to medicated or flea collars without adversely affecting the operation of the medication, and which may be worn by animals even in the absence of an animal collar to obtain the highly attractive ornamental effect thereof.

It is still another object of the present invention to provide a cover for an animal collar having the advantageous characteristics mentioned in the preceding paragraph, which is relatively inexpensive to manufacture for distribution and sale at a reasonable price, extremely simple in construction and durable and reliable throughout a long useful life, and capable of manufacture out of washable materials for repeated cleaning.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
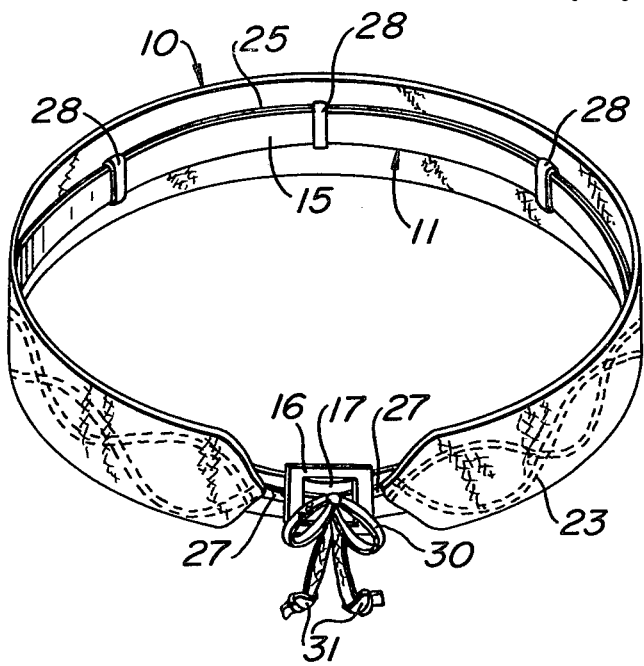
FIG. 1 is a top perspective view showing an animal collar cover of the present invention in opertive association with an animal collar, the collar and cover being in the operative closed loop condition.

Referring now more particularly to the drawings, and specifically to FIG. 1 thereof, an animal collar cover is there generally designated 10, circumposed about the outer side of an animal collar 11, which may be conventional, such as fabricated of leather, plastic, fabric, or the like. In practice, animal collars 11 of the medicated or flea collar type are conventionally employed about an animal's neck, or elsewhere if desired, and for appearance and safety reasons it is highly advantageous to apply the collar cover 10 which effectively obscures the collar 11 from view, and effectively prevents or limits personal contact with the collar.

The animal or flea collar 11 may include a flexible elongate element 15, having on one end a buckle 16, say of a rectilinear outline configuration as illustrated, or otherwise, and having a central through opening 17. In the conventional manner, the buckle 16 on one end of the elongate collar element 15 serves as an adjustable connection to the other end of the elongate collar element.

Figure 2:
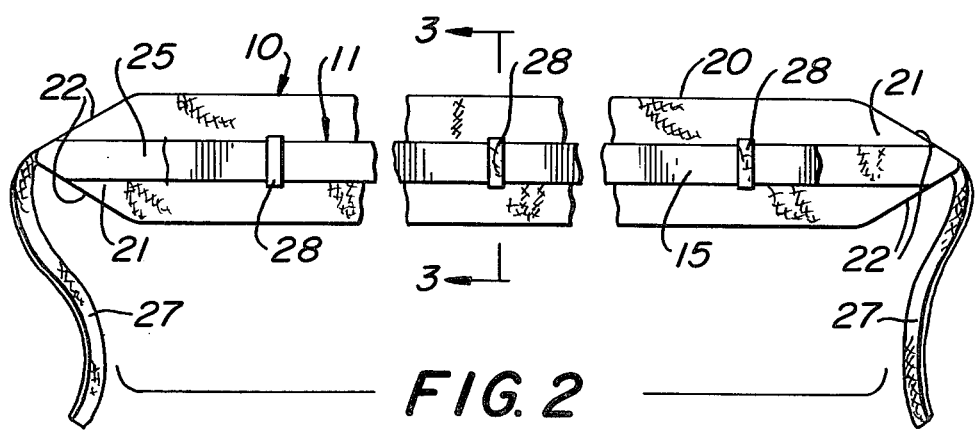
FIG. 2 is a plan view showing an animal collar and cover in association therewith, with parts broken away.
Figure 3:
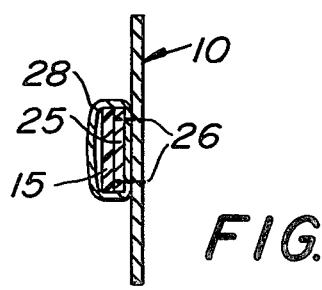
FIG. 3 is a transverse sectional view generally along the line 3—3 of FIG. 2.

The collar cover 10 is best seen in FIGS. 2 and 3, and as there illustrated includes an elongate flexible strip 20, advantageously of washable textile fabric, or other suitable flexible sheet means, and relatively imperforate, for reasons appearing presently. The strip 20 is of elongate configuration, and of width appreciably greater than the width of an associated elongate collar element 15. the elongate fabric strip 20 may have opposite end portions 21 attractively configured, as by convergent edge portions 22, so as to define outwardly tapering end portions. On one surface of the strip 20, the outer surface as seen in FIG. 1, there may be provided suitable ornamentation, as at 23, say in the material of the strip.

Extending longitudinally along the inner face or side of the strip 20, spaced laterally medially between the side edges thereof, is a reinforcing tape or strip 25, also advantageously fabricated of textile sheet material and suitably secured to the strip 20, as by stitching, shown at 26 in FIG. 3. The tape, ribbon or band 25 may have a lateral dimension approximating that of the elongate collar element 15, being interposed between the latter and the ornamental strip 20 to effectively reinforce and protect the latter strip. Further, end portions 27 of the tape, ribbon or band 25 extend oppositely beyond respective ends of the ornamental strip 20, and each is secured in a condition folded upon itself to reduce its width and define freely extending end ties in the manner of cord or piping. Thus, it will be seen that the flexible end ties 27 extend longitudinally outwardly from respective end portions 21 of the strip 20, laterally medially of the latter.

At locations longitudinaly spaced along the tape or band 25 and spaced laterally medially between the side edges of the strip 20, there are provided a plurality of transversely extending loops or eyes 28, which are advantageously formed of suitable fabric material, such as woven ribbon, or elastic. The loops or eyes may be spaced along the tape or ribbon 25, and secured between the latter and the strip 20 by the stitching 26, as seen in FIG. 3. As may be seen in FIGS. 2 and 3, the elongate collar element 15 may extend through the several loops or eyes 28, whereby the collar 11 is attached to the cover 10, the collar being retained in position laterally medially of the cover spaced between the side edges thereof. While the loops or eyes 28 may be fabricated of either elastic or inelastic material, the former serves to afford accommodation to collar elements 15 of a wide range of sizes, while the latter may be advantageous when firm retention of a conventional collar size is desired.

With the animal collar 11 closed, having its buckle 16 connected to both ends of the elongate element 15, and the cover extending circumferentially about and on the outer side of the animal collar, receiving the latter in the loops 28, the flexible ribbon end portions or ties 27 may be extended through the central opening 17 of collar 16 and tied togther in any suitable fashion, as by a bow 30. That is, the ties 27 may extend toward each other, each extending between the elongate collar element 15 and the adjacent side of buckle 16, and thence outwardly through the central buckle opening 17 for securement at 30. Further, the ties 27 may be provided on their distal ends with enlargements 31, say in the form of knots, to effectively retain the ties from inadvertent retraction through the buckle 16.

In this manner it will be appreciated that the cover 10 is effectively secured in position on the collar 11, whether the loops 28 be elastic or inelastic, maintaining the collar laterally medially of the cover to effectively obscure the collar from view and exposure to animal handlers and other persons. Thus, rather than a worn or otherwise unattractive animal collar 11 being presented to view, there is apparent substantially only the highly attractive and aesthetic appearance of the collar cover 10. However, the animal collar buckle 16 may be observed, and attractively ornamented by the bow 30 of the collar cover end strings or ties 27.

From the foregoing, it is seen that the present invention provides a cover for an animal collar which is highly attractive in appearance, safe, economical and durable throughout a long useful life, and which otherwise fully accomplishes its intended objects.

Although the present invention has been described in some detail by way of illustration and example for purpose of clarity of understanding, it is understood that certain changes and modifications may be made within the spirit of the invention.

What is claimed is:

1. In combination, a dog collar comprising an elongate flexible collar element, and a buckle on one end of said collar element for adjustable connection to the other end of said collar element; and a protective and ornamental cover for said dog collar comprising an elongate strip of decorative flexible fabric for extension along the outer side of said collar element, said strip being wider than said collar element to obscure the latter and protect persons from excessive contact with said collar element, loops spaced along the inner side of said strip laterally medially thereof for slidably receiving spaced regions of said collar element, end ties extending from respective ends of said strip for retaining engagement with a said buckle, said ties being adapted for connection together and to said buckle for positively locating said strip in position relative to said collar element, and a lining tape secured along the inner side of and coextensive with said strip laterally medially thereof for wear resistant engagement with said collar element, said ties being defined by end extensions of said tape extending beyond opposite ends of said strip for extension through said buckle.

2. The combination according to claim 1, said fabric of said strip being imperforate for effective protection from said collar element of a flea collar.

3. The combination according to claim 1, in combination with enlargements on said end ties for engagement in said buckle.

4. The combination according to claim 1, said lining tape and loops being of fabric and stitched to said fabric strip.

5. The combination according to claim 4, said loops being elastic for accommodating reception of a wide range of collar elements.

* * * * *